(12) United States Patent
Tages

(10) Patent No.: US 7,409,237 B2
(45) Date of Patent: Aug. 5, 2008

(54) CLIP ASSEMBLY WITH LATERAL LOCK AND INTERCHANGEABLE CLIP ARM INTERFACE AND METHOD

(75) Inventor: Fernando Tages, Coral Springs, FL (US)

(73) Assignee: A.G. Findings & Mfg. Co., Inc., Sunrise, FL (US)

(*) Notice: Subject to any disclaimer, the term of this patent is extended or adjusted under 35 U.S.C. 154(b) by 419 days.

(21) Appl. No.: 11/281,787

(22) Filed: Nov. 17, 2005

(65) Prior Publication Data

US 2006/0246963 A1  Nov. 2, 2006

Related U.S. Application Data

(63) Continuation-in-part of application No. 11/118,651, filed on Apr. 30, 2005.

(60) Provisional application No. 60/717,159, filed on Sep. 15, 2005.

(51) Int. Cl.
*H04B 1/08* (2006.01)

(52) U.S. Cl. .................. 455/575.1; 455/348; 24/3.11

(58) Field of Classification Search .............. 455/575.1, 455/347, 348, 351; 379/454, 455; 24/3.11, 24/3.12
See application file for complete search history.

(56) References Cited

U.S. PATENT DOCUMENTS

| | | | | |
|---|---|---|---|---|
| 5,081,709 A | * | 1/1992 | Benyo et al. ................ 455/348 |
| 5,356,060 A | * | 10/1994 | Kuroda ....................... 224/670 |
| 5,597,102 A | | 1/1997 | Saarikko et al. ............. 224/197 |
| 5,850,996 A | | 12/1998 | Liang .......................... 247/221 |
| 6,283,348 B1 | * | 9/2001 | Wang .......................... 24/3.11 |

* cited by examiner

*Primary Examiner*—Thanh C Le
(74) *Attorney, Agent, or Firm*—Robert C. Kain, Jr.

(57) ABSTRACT

The clip assembly includes a lateral lock and sometimes an interchangeable clip arm interface. The lateral lock in a receiving passage of the clip body cooperates with a button stem mounted on the cell phone or PED. The lock is sometimes a detent, spring operated ball. The button stem cooperates with releasable locking element. A clip arm on the main body can be attached to a belt or strap of the user. The method includes laterally interlocking the detent with the locking element on the button. An interleaved, complementary tongue and groove mount permits interchangeably mounted clip arms on the main body.

37 Claims, 4 Drawing Sheets

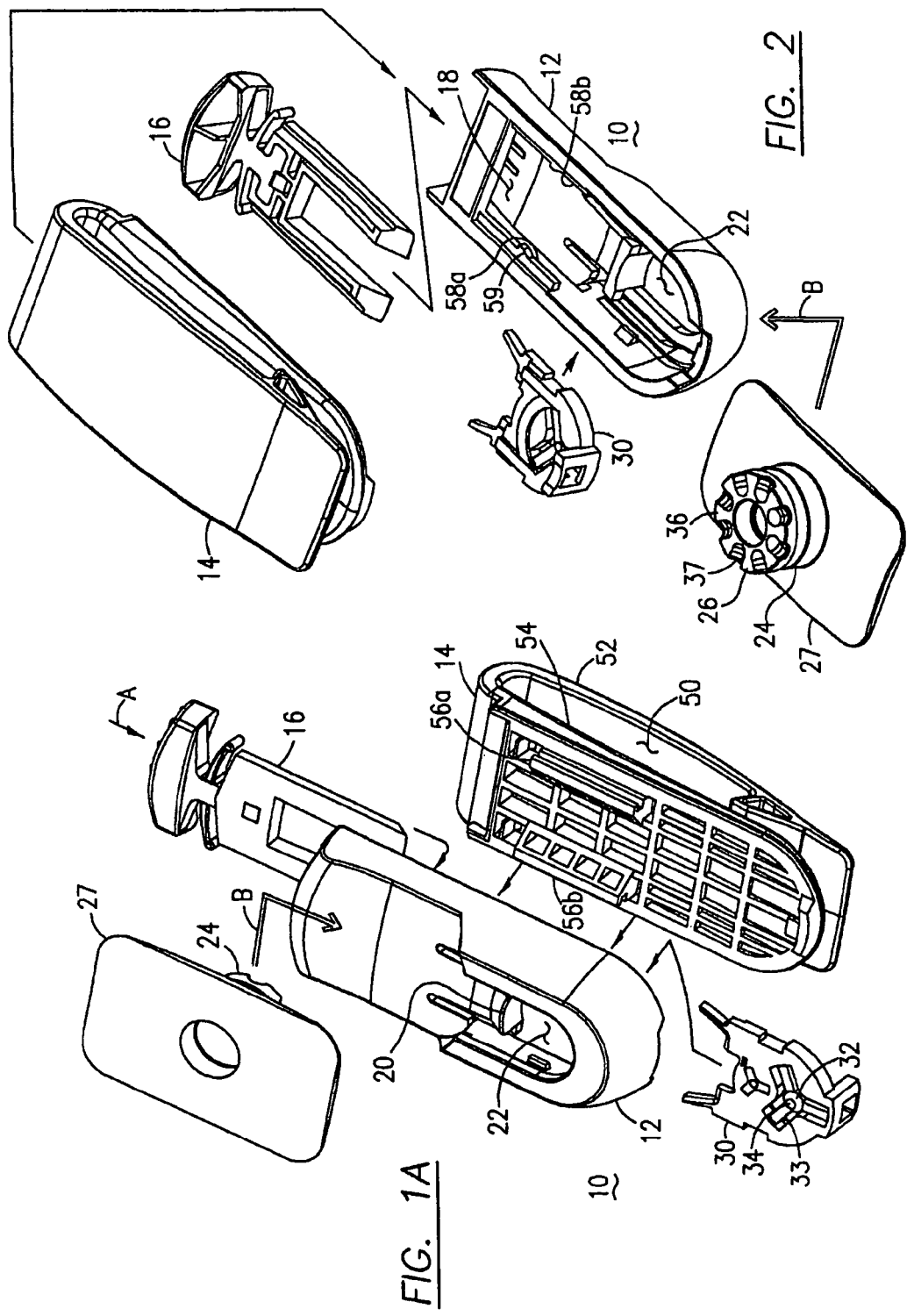

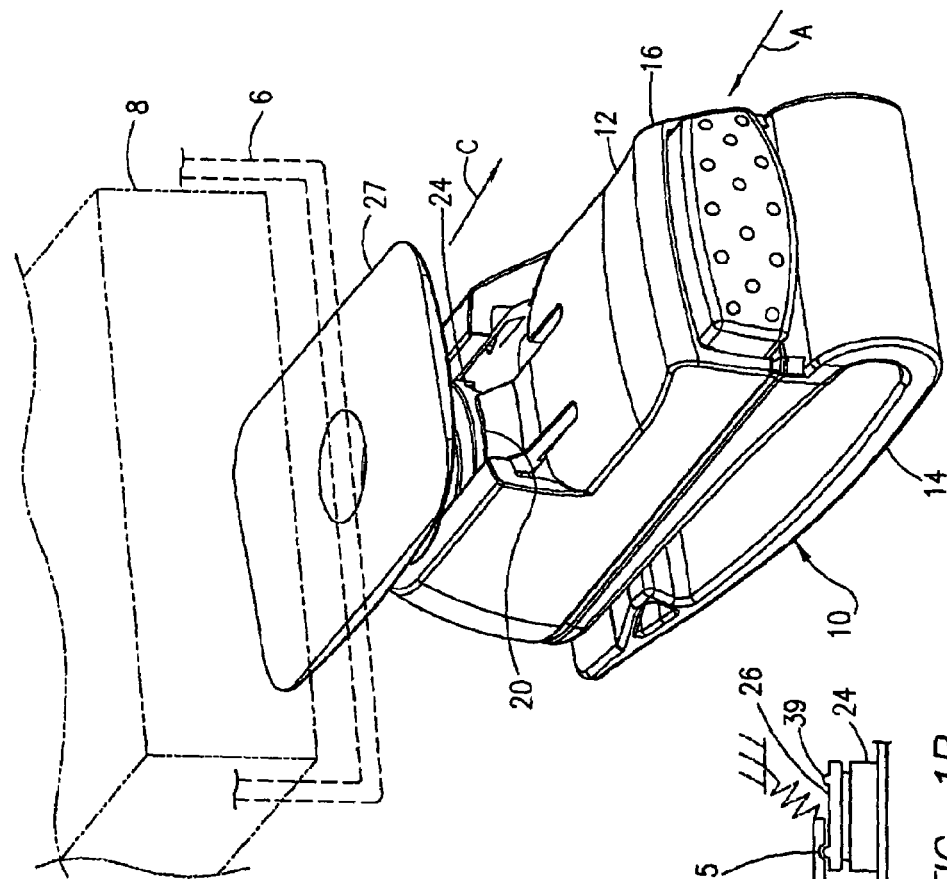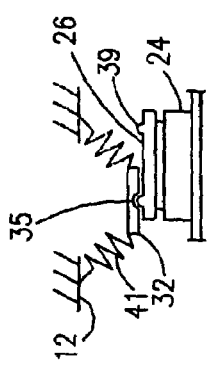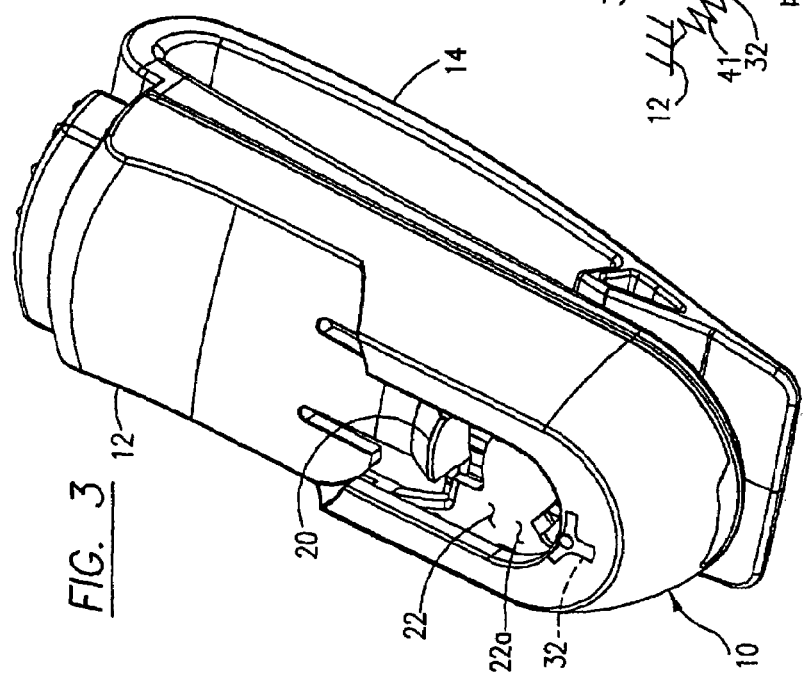

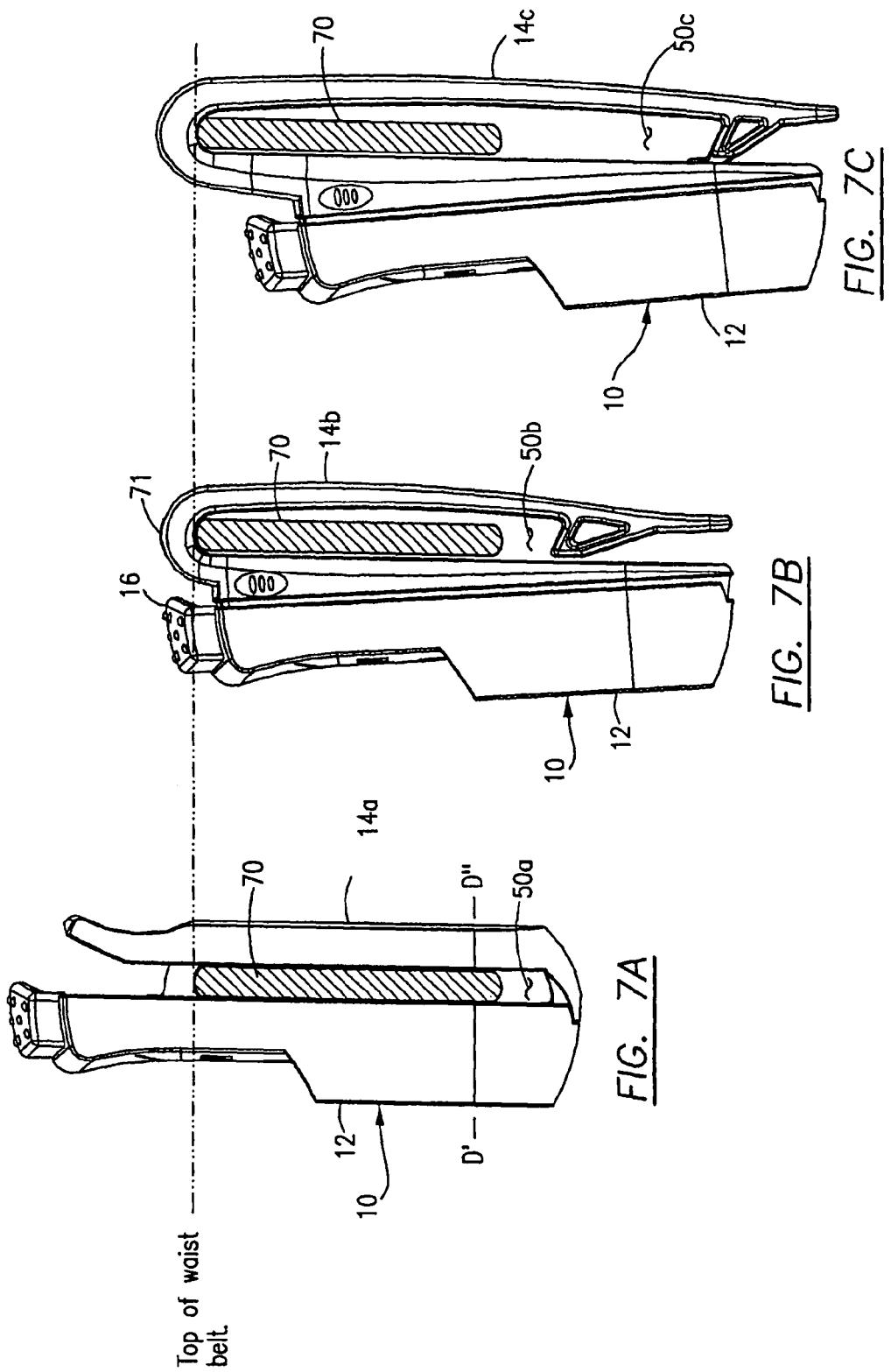

CLIP ASSEMBLY WITH LATERAL LOCK AND INTERCHANGEABLE CLIP ARM INTERFACE AND METHOD

This is a continuation in part of patent application Ser. No. 11/118,651, filed Apr. 30, 2005, now pending, and further the present application is a regular patent application which claims the benefit of priority of provisional patent application Ser. No. 60/717,159 filed Sep. 15, 2005.

The present invention relates to clip assembly for devices having a button stem attachment. These devices include cellular telephones or other personal electronic devices (herein "PEDs") such as personal data assistants (PDA), digital cameras (movie cameras and still cameras), small portable digital video players, digital memory store music players (for example, IPODS (Apple Computer Co. trademark)), MP3 players, small portable game players (for example, PSP PlayStation Portable players, Sony trademark), and other small, portable, electronic devices commonly carried by a person.

Many users of cell phones carry the cell phones on their belts or straps. Due to the decrease in size and weight of personal electronic devices, such as personal digital assistants, MP3 players, PDAs and small computers or communicators, these personal electronic devices or PEDs can also be carried on a user's belt, purse strap, pant pocket or other belt-like structure.

In some prior art clip assembly systems, the phone or PED personal electronic device is adapted to be removably attached to main clip body unit via a button stem attached to a cell phone or PED. The button, in prior art devices, slides in and out of receiving passage formed by mail clip body unit and the button is releaseably locked or latched in the receiving passage of the main body. The following patents describe prior art releasable button mounts: U.S. Pat. No. 5,597,102 to Saarikko (issued Jan. 28, 1997); U.S. Pat. No. 5,850,996 to Liang (issued Dec. 22, 1998) and U.S. Pat. No. 6,283,348 to Wang (issued Sep. 4, 2001).

Some prior art buttons have recesses about the cylindrical body surface of the button stem. The cavities cooperate with a spring loaded pin in the main clip assembly body such that, as the cell phone rotates about the axial centerline of the cylindrical button stem, the phone is releasably locked at various angular positions with respect to the generally vertically disposed clip assembly.

OBJECTS OF THE INVENTION

It is an object of the present invention to provide a clip assembly which has a lateral lock locking system which releasably locks the cell phone or PED at various angular positions as the cell phone or PED rotates about a lateral central axis through a receiving passage in the clip assembly.

It is another object of the present invention to provide a lateral locking clip assembly operable in conjunction with a button stem mounted on the cell phone or PED.

It is a further object of the present invention to provide a spring mounted lateral lock which cooperates with lock faces on the button stem protruding from the back side of the cell phone or PED.

It is a further object of the present invention to provide a method for laterally releasably latching a cell phone or PED.

It is an additional object of the present invention to provide an interleaved, complementary tongue and groove mount between the main body of the clip assembly and one or more clip arms such that clip arms can be interchangeably mounted on the main body.

It is an additional object of the present invention to provide clip arms having different clip spaces to enable the user to change the clip arms to effect the height, clip span length or clip span depth of the clip arm, and, hence, the clip assembly.

SUMMARY OF THE INVENTION

The clip assembly, in one embodiment, includes a lateral lock and, in a different embodiment, an interchangeable clip arm interface. With respect to the lateral lock, the main clip body defines a receiving passage. A button stem, mounted on the cell phone or PED, is removably retained by the main clip body when the button is disposed in the receiving passage. The main body defines a detent near the receiving passage configured, in one embodiment, as a spring operated ball. The button stem has an end face defining a first releasable locking element and a detent defines a second complementary releasable locking element. A clip arm is mounted to the main body such that the clip assembly can be attached to a belt or strap of the user. The first and second releasable locking elements (respectively on the button and detent) may be concave or convex complementary elements. The detent may be spring loaded to laterally provide a locking force with one, two or three legs providing spring action to the locking element. The method includes capturing the button stem in the receiving passage, providing the spring mounted detent, and during locking action, either laterally interlocking the detent with the locking element on the button and, during non-locking action, disengaging the locking elements such that the elements are not interlocked. Rotational movement about the button stem axis is limited by the lock and release mechanism between the detent and the button stem. With respect to the interleaved, complementary tongue and groove mount, a number of different clip arm elements, having one of the complementary tongue and groove mounts, can be interchangeably attached via the mount on the main body of the clip assembly. In this manner, several different clip spaces defined by different clip arms can be mounted via the interleaved, complementary tongue and groove mount system on a single main clip body.

BRIEF DESCRIPTION OF THE DRAWINGS

Further objects and advantages of the present invention can be found in the detailed description of the preferred embodiments when taken in conjunction with the accompanying drawings in which:

FIG. 1A diagrammatically illustrates an exploded view of the belt or clip assembly showing, among other things, the spring loaded second releasable locking element and the tongue and groove mount system on one clip arm;

FIG. 1B diagrammatically illustrates the spring loaded detent or second releasable locking element which coacts with the button stem;

FIG. 2 diagrammatically illustrates an exploded view of the clip assembly and, in particular, shows the first releasable element on the button stem and shows one half of the complementary tongue and groove mount interface for the clip arm;

FIG. 3 diagrammatically illustrates a right side perspective view of the assembled clip assembly;

FIG. 4 diagrammatically illustrates a front, left side perspective view of the assembled clip assembly with the button mount disposed in the receiving passage and the cell phone or PED shown in dashed lines (schematic for illustration purposes only);

FIGS. 7A, 7B and 7C diagrammatically illustrate clip assemblies with three different clip arms, each having different clip spaces (open volume shape, clip span length and clip span depth) useful with the interleaved, complementary tongue and groove system.

DETAILED DESCRIPTION OF THE PREFERRED EMBODIMENTS

Figure 5B:
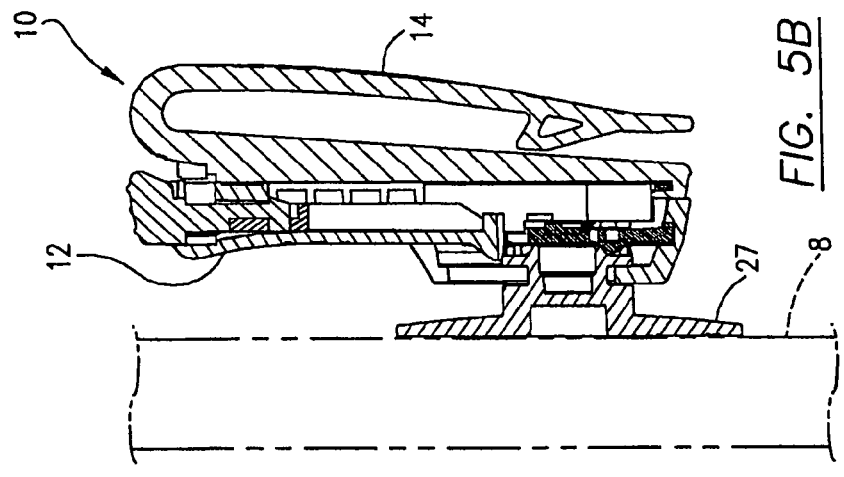
FIGS. 5A and 5B diagrammatically illustrate a front elevational view and a cross sectional side view of the clip assembly.

The present invention relates to a clip assembly for cell phone or PED with a lateral lock and, in a different embodiment, a clip assembly with an interchangeable clip arm interface, and a lateral lock method. Similar numerals designate similar items throughout the drawings. The term "lateral" refers to any direction similar to the axial centerline of the cylindrical button stem or the axial centerline of the receiving passage in the clip assembly main body. FIGS. 1A and 2 are discussed concurrently herein. FIG. 1A shows an exploded view of a belt or clip assembly 10. The major components of clip assembly 10 include main clip body 12 and clip arm 14. A plunger-actuator 16 is fitted into the backside space 18 (FIG. 2) of main clip body 12. A good description of the operation of actuator-plunger 16 is found in U.S. patent application Ser. No. 10/791,128, filed Mar. 2, 2004 and Ser. No. 11/156,861, filed Jun. 20, 2005, which descriptions are incorporated herein by reference thereto. Effectively, when the user depresses actuator/plunger 16 as shown by arrow A in FIG. 1A, the locking tab 20 in receiving passage 22 is withdrawn (inboard and to some extent laterally), thereby releasing locking tab 20 from a groove or a protrusion on button stem 24. As shown best in FIG. 2, button stem 24 includes an end face 26. Button stem 24 is mounted on a mounting plate 27. As shown and discussed later in conjunction with FIG. 4, mounting plate 27 is mounted to the cell phone or PED.

Returning to FIG. 1A, the button and the associating mounting plate 27 and cell phone or PED, is captured by clip assembly 10 when the button is moved as shown by arrow B into receiving passage 22. A good description of the operation of button stem 24 with respect to receiving passage 22 is provided in U.S. patent application Ser. No. 10/791,128, filed Mar. 2, 2004, which description and specification is incorporated herein by reference thereto. Essentially, the main clip body 12 defines a detent releasable lock when button stem 24 is in receiving passage 22. Plate element 30 is mounted or defined or lodged within the interior space of clip body 12. Plate element 30 carries a releasable locking element 32 which is spring loaded or spring mounted on plate element 30. In the illustrated embodiment, the spring mount is provided by three legs, one of which is leg 33, which permits convex element 34 (illustrated as a semi-hemispherical ball) to move laterally forward and aft within receiving passage 22.

Button stem 24 includes end face 26 with at least one releasable locking element 37. In a preferred embodiment, the first releasable locking element 36 is defined as a recess about the periphery end surface 36 of the button stem 24. However, first releasable locking element 37 may be defined as either concave cavities or recesses on end face 26 of button stem 24 or may be defined by convex structures on the button face. The recesses on the end face 26 may be open to the side of the generally cylindrically shaped button stem 24.

FIG. 1B diagrammatically shows button stem 24 with convex releasable locking elements 39 on button face 26. The second releasable locking element 32 in plate element 30 has a complementary locking element structure 35 defined as a concave lock element. See FIG. 1A. Of course, the recesses on end face 24 (FIG. 2) may take any type of shape and need not be semi-hemispherical. For example, triangular shapes and raised lands cooperating with recessed channels provide the same type of first and second releasable locking elements as those described herein. The important factor is that detent 32 in plate element 30 carries a spring loaded releasable locking element 34, 35 which cooperates with the first releasable locking element 37, 39 on the button stem 24. In the illustrated embodiment, detent 32 shown in FIG. 1A has three legs providing lateral spring action. In FIG. 1B, a single spring 41 is illustrated between the detent 32 and the main clip body diagrammatically illustrated as stationary element 12 in FIG. 1B. A second spring element shown in dashed lines in FIG. 1B may be utilized. Of course, more than three spring elements may be utilized to provide lateral spring action of detent 32 with respect to receiving passage 22 and main body 12. The three legs shown in FIG. 1A provide these spring elements. Single, double or multiple spring elements may be employed.

FIG. 1A also diagrammatically illustrates clip arm 14 having a downwardly opened U-shaped clip space 50. Clip space 50 is defined by arm element 52 and base element 54. Base element 54 includes, in the illustrated embodiment, channel structures 56A, 56B. Channel structures 56A, 56B, cooperate with tongue structures 58A, 58B formed in the interior space 18 of main body 12. These tongue structures 58A, 58B are best shown in FIG. 2. Of course, base 54 of clip arm 14 may carry the tongue structures 58A, 58B and main body 12 may carry the channel structures 56A, 56B. In any event, when the tongue is placed in the groove or channel, an interleaved, complementary tongue and groove mount is provided. As an additional feature, lock tabs 59 may be provided on the interface. However, if the interface is to be used with interchangeable or different size clip arms (see FIGS. 7A, 7B and 7C), lock tabs 59 will be eliminated.

It should be noted that detent 32 may be formed with different types of structures integral to main body 12 or two or three piece elements may be utilized in conjunction with main body 12 and plate element 30.

FIG. 3 diagrammatically illustrates a perspective, front view of clip assembly 10. FIG. 4 diagrammatically shows a perspective front view of clip assembly 10 wherein button stem 24 is captured in receiving channel 22 (FIG. 3). Capture lock tongue 20 has grabbed and restrained the button stem 24. Button mount plate 27 is diagrammatically shown as being attached to cell phone or PED 8. Alternatively or in addition thereto, button mount 27 may have a grasping or retaining structure 6 which further retains cell phone or PED. In this manner, button mount 27, 24 is carried by the cell phone or PED 8. To release the cell phone or PED 8, the user depresses actuator plunger 16 as shown by arrow A and this action retracts locking tongue element 20 from button stem 24. Thereafter, the button stem, the button mount 27 and PED or cell phone 8 can be withdrawn from clip assembly 10 in the direction shown by arrow C.

Figure 5A:
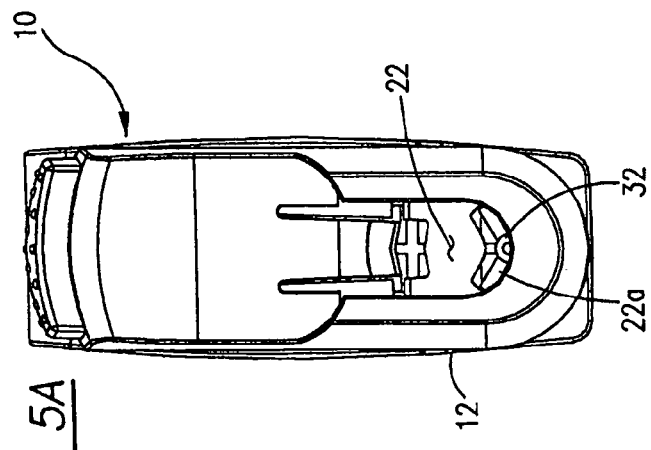

FIG. 5A diagrammatically shows that spring loaded laterally protruding detent 32 is located in the lower edge region 22a of receiving passage 22. The same view is provided in FIG. 3. In this manner, the complementary locking element on button stem 24 can be located about the periphery of end face 26. See FIG. 2. Of course, the locking detent on main clip body 12 may be located at the left or the right rather than near bottom area 22a. Further, locking element may only coact with the periphery 37 of button stem 24.

Figure 6:
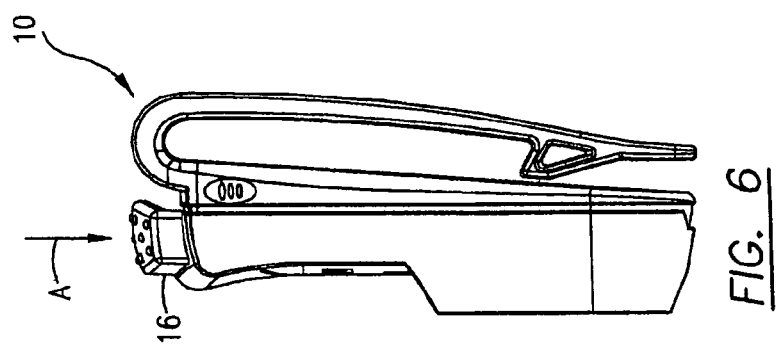
FIG. 6 diagrammatically illustrates a right side elevational view of the clip assembly.

FIG. 5B shows a diagrammatic, cross-sectional view of button mounting plate 27, main body 12 and clip arm 14. FIG. 6 is a right side elevational view of clip assembly 10. Plunger actuator 16 is depressed as shown by arrow A in FIG. 6 in order to release locking arm 22 from button stem 24.

FIGS. 7A, 7B, 7C diagrammatically show clip assembly 10 having different clip arms 14a, 14b and 14c, each with a different downwardly open U-shaped clip space 50a, 50b, and 50c. Belt or strap 70 is operatively captured in the clip space 50a, b and c. With the utilization of the complementary interleaved tongue and groove mount system 56a, 56b, 58a, 58b, different clip arms 14a, 14b, 14c may be removably interchangeably placed on clip body 12. Some users may want the clip body 10 to ride high with respect to the top of the waste belt 70. Riding high is generally viewed from the lateral central axis D'-D" of the receiving passage 22. FIG. 7A shows a high riding clip arm system 14a, FIG. 7B shows a medium ride wherein the plunger actuator 16 is laterally coextensive with upper end 71 of clip arm 14b. The clip assembly in FIG. 7C shows that main clip body 12 is positioned below the top of the waist belt 70 to achieve a low riding effect. Further, the lateral space defined by clip arm 14a, 14b and 14c is different. Also, the volume of a clip space is different for clip arms 14a, 14b and 14c. Therefore, the clip length relative to the belt 70, clip lateral depth (normal to the belt) and clip space volume is different for clip arms 14a, 14b and 14c. The clip spaces, either in volume or in length (the vertical distance coextensive with belt 70) or in lateral depth, is different for each clip arm.

The claims appended hereto are meant to cover modifications and changes within the scope and spirit of the present invention.

What is claimed is:

1. A belt or strap clip assembly for a cellular telephone or a personal electronic device wherein said cellular telephone or personal electronic device carries a button stem thereon with an end face having first releasable locking element, the clip assembly comprising:
   a main body defining a receiving passage adapted to removably retain said button stem and its associated cellular telephone or personal electronic device;
   a detent configured as a spring operated ball defining a second releasable locking element complementary to said first releasable locking element, said detent located in said receiving passage on said main clip body; and
   a clip arm mounted to said main body, said clip arm adapted to removably attach said clip assembly to said belt or strap.

2. A clip assembly as claimed in claim 1 wherein said detent is spring mounted to said main body by one of a single leg, two legs or three legs.

3. A clip assembly as claimed in claim 1 wherein said first locking element on said button end face is a plurality of recesses and said detent forces said ball into an adjacent recess.

4. A clip assembly as claimed in claim 3 wherein said recesses are defined on a periphery of said button end face and said detent is located in an edge region of said receiving passage on said main clip body.

5. A clip assembly as claimed in claim 2 wherein said first locking element on said button end face is a plurality of recesses and said detent forces said ball into an adjacent recess.

6. A clip assembly as claimed in claim 5 wherein said recesses are defined on a periphery of said button end face and said detent is located in an edge region of said receiving passage on said main clip body.

7. A belt or strap clip assembly for a cellular telephone or a personal electronic device wherein said cellular telephone or personal electronic device carries a button stem thereon with an end face having first releasable locking element formed as at least one of a concave or convex locking element, the clip assembly comprising:
   a main body defining a receiving passage adapted to removably retain said button stem and its associated cellular telephone or personal electronic device;
   a spring mounted detent as a second releasable locking element complementary to said first releasable locking element, said detent being at least one of a complementary concave or convex locking element, and said detent located in said receiving passage on said main clip body; and
   a clip arm mounted to said main body, said clip arm adapted to removably attach said clip assembly to said belt or strap.

8. A clip assembly as claimed in claim 7 wherein said spring mounted detent is mounted to said main body by one of a single leg, two legs or three legs.

9. A clip assembly as claimed in claim 7 wherein said first locking element on said button end face is a plurality of recesses and said detent is a convex locking element, said detent forces said convex locking element into an adjacent recess.

10. A clip assembly as claimed in claim 9 wherein said recesses are defined on a periphery of said button end face and said detent is located in an edge region of said receiving passage on said main clip body.

11. A clip assembly as claimed in claim 8 wherein said first locking element on said button end face is a plurality of recesses and said detent is a convex locking element, said detent forces said convex locking element into an adjacent recess.

12. A clip assembly as claimed in claim 11 wherein said recesses are defined on a periphery of said button end face and said detent is located in an edge region of said receiving passage on said main clip body.

13. A system for attaching, to a user's belt or strap, a cellular telephone or a personal electronic device comprising:
   a button adapted to be mounted to said cellular telephone or personal electronic device, said button having a button stem with an end face having first releasable locking element formed as at least one of a concave or convex locking element;
   a clip assembly main body defining a receiving passage adapted to removably retain said button stem and its associated cellular telephone or personal electronic device;
   a spring mounted detent as a second releasable locking element complementary to said first releasable locking element, said detent being at least one of a complementary concave or convex locking element, and said detent located in said receiving passage on said main clip body; and
   a clip arm mounted to said main body, said clip arm adapted to removably attach said clip assembly to said belt or strap.

14. A system for attaching, to a user's belt or strap, a cellular telephone or a personal electronic device as claimed in claim 13 wherein said spring mounted detent is mounted to said main body by one of a single leg, two legs or three legs.

15. A system for attaching, to a user's belt or strap, a cellular telephone or a personal electronic device as claimed in claim 13 wherein said first locking element on said button end face is a plurality of recesses.

16. A system for attaching, to a user's belt or strap, a cellular telephone or a personal electronic device as claimed in claim 15 wherein said detent is a convex locking element, said detent forces said convex locking element into an adjacent recess.

17. A system for attaching, to a user's belt or strap, a cellular telephone or a personal electronic device as claimed in claim 15 wherein said recesses are defined on a periphery of said button end face.

18. A system for attaching, to a user's belt or strap, a cellular telephone or a personal electronic device as claimed in claim 17 wherein said detent is located in an edge region of said receiving passage on said main clip body.

19. A system for attaching, to a user's belt or strap, a cellular telephone or a personal electronic device as claimed in claim 14 wherein said first locking element on said button end face is a plurality of recesses and said detent is a convex locking element, said detent forces said convex locking element into an adjacent recess.

20. A system for attaching, to a user's belt or strap, a cellular telephone or a personal electronic device as claimed in claim 19 wherein said recesses are defined on a periphery of said button end face and said detent is located in an edge region of said receiving passage on said main clip body.

21. A button attachment system for attaching a cellular telephone or a personal electronic device to a strap or belt clip assembly, said clip assembly having a main body defining a receiving passage, a detent releasable locking element located at or near said receiving passage, said detent releasable locking element being at least one of a complementary concave or convex locking element, the button attachment system comprising:
  a button adapted to be mounted to said cellular telephone or personal electronic device, said button having a button stem with an end face having first releasable locking element formed as at least one of a concave or convex locking element which is complementary to said detent releasable locking element such that said button, and said cellular telephone or personal electronic device mounted thereto, is adapted to rotate with respect to said clip assembly due to the interlock between said detent releasable locking element and said between complementary first releasable locking element on said button.

22. A button attachment system as claimed in claim 21 wherein said button end face has a plurality of complementary first releasable locking elements formed thereon.

23. A button attachment system as claimed in claim 21 wherein said complementary first releasable locking element is a recess.

24. A button attachment system as claimed in claim 22 wherein said complementary first releasable locking elements are a plurality of recesses.

25. A button attachment system as claimed in claim 24 wherein said recesses are defined on a periphery of said button end face.

26. A button attachment system as claimed in claim 21 wherein said detent releasable locking element is a convex locking element and said complementary first releasable locking element on said button end face is a plurality of recesses which coact with said detent such that said convex locking element is forced into an adjacent recess on said button.

27. A method for laterally releasably locking a cellular telephone or a personal electronic device on a belt or strap clip assembly, wherein said cellular telephone or personal electronic device carries a button stem thereon with an end face having first releasable locking element formed as at least one of a concave or convex locking element, the method comprising:
  capturing said button stem in a receiving passage in a main body of said clip assembly;
  providing a spring mounted detent as a second releasable locking element complementary to said first releasable locking element, said detent located in said receiving passage on said main clip body;
  during locking action, said detent providing a lateral locking force either laterally into said concave locking element or laterally retracting away from said convex locking element; and
  during non-locking action while said button stem is captured in said receiving passage, said first releasable locking element not interlocked with said second releasable locking element; and
  clipping said main body clip assembly to said belt or strap.

28. A method for laterally releasably locking a cellular telephone or a personal electronic device on a belt or strap clip assembly as claimed in claim 27 wherein said clip assembly has a front side and a rear side, and said receiving passage is located on said front side and the clipping action onto said belt of strap occurs on said rear side, said button stem carried by said cellular telephone or personal electronic device protruding from a rear side of said cellular telephone or personal electronic device, the method including providing said spring mounted detent with lateral spring force action permitting spring action between said rear side of said cellular telephone or personal electronic device and said front side of said clip assembly.

29. A belt or strap clip assembly for a cellular telephone or a personal electronic device comprising:
  a main body having a first side adapted to removably retain and carry said cellular telephone or personal electronic device in a receiving passage, said receiving passage having a centrally located lateral axis therethrough, said main body having a second backside;
  said main body defining either a tongue or a groove mounting element at said backside;
  a first and a second clip arm element each having a longitudinal center plane therethrough, each of said first and second clip arm elements respectively defining a complement of said tongue or groove mounting element such that a respective one of said clip arm elements is mounted to said main body via an interleaved, complementary tongue and groove mount;
  said first clip arm element and said second clip arm element forming respective downwardly open U-shaped clip spaces with corresponding first and second spacial clip spaces, said first spacial clip spaces shifted downward with respect to said second spacial clip spaces such that, when said first clip arm element is mounted via said interleaved, complementary tongue and groove mount, said clip assembly is high with respect to said belt or strap, and when said second clip arm element is mounted via said interleaved, complementary tongue and groove mount, said clip assembly is low with respect to said belt or strap.

30. A belt or strap clip assembly as claimed in claim 29 including a third clip arm element forming a respective downwardly open U-shaped clip space with a corresponding third spacial clip space, said first, second and third spacial clip spaces shifted progressively downward with respect to each other such that, when a respective clip arm element is mounted via said interleaved, complementary tongue and groove mount, said clip assembly is high, medium and low with respect to said belt or strap.

31. A belt or strap clip assembly as claimed in claim 30 wherein said first, second and third clip arm elements are interchangeable on said main body tongue or groove mounting element.

32. A belt or strap clip assembly as claimed in claim 30 wherein said high and low mounts for said first and second clip arm elements are high and low with respect to said centrally located lateral axis.

33. A belt or strap clip assembly for a cellular telephone or a personal electronic device comprising:
- a main clip body having a first side adapted to removably retain and carry said cellular telephone or personal electronic device in a receiving passage, said main body having a second backside;
- said main body defining either a tongue or a groove mounting element at said backside;
- a first clip arm element having a first downwardly open U-shaped clip space;
- a second clip arm element having a second downwardly open U-shaped clip space, said first and second clip spaces being different;
- each of said first and second clip arm elements respectively defining a complement of said tongue or groove mounting element such that a respective one of said clip arm elements is mounted to said main body via an interleaved, complementary tongue and groove mount; and,
- in a first mode with said main body coupled to said first clip arm element via said interleaved, complementary tongue and groove mount, said clip assembly operative with said first downwardly open U-shaped clip space, and, in a second mode with said main body coupled to said second clip arm element via said interleaved, complementary tongue and groove mount, said clip assembly operative with said second downwardly open U-shaped clip space.

34. A belt or strap clip assembly as claimed in claim 33 wherein said first and second clip spaces being different in one of an open volume shape, a clip span length and lateral span depth.

35. A belt or strap clip assembly as claimed in claim 33 wherein said first and second clip arms are interchangeable on said main body.

36. A belt or strap clip assembly as claimed in claim 33 including a third clip arm with a third different downwardly open U-shaped clip space and said complement of said tongue or groove mounting element defined thereon such that said third clip arm is interchangeable with respect to said first and second clip arms on said main body.

37. A belt or strap clip assembly as claimed in claim 36 wherein said first, second and third clip spaces are different in one of an open volume shape, a clip span length and lateral span depth.

* * * * *